June 23, 1953 P. L. THURSTON 2,642,732
KNITTED ARTICLE OF HOSIERY
Filed Dec. 26, 1951 9 Sheets-Sheet 1

INVENTOR.
PAUL L. THURSTON
BY
ATTORNEY.

June 23, 1953     P. L. THURSTON     2,642,732
KNITTED ARTICLE OF HOSIERY
Filed Dec. 26, 1951     9 Sheets-Sheet 7

INVENTOR.
PAUL L. THURSTON
BY Robert E. Burns
ATTORNEY

June 23, 1953 P. L. THURSTON 2,642,732
KNITTED ARTICLE OF HOSIERY
Filed Dec. 26, 1951 9 Sheets-Sheet 9

INVENTOR.
PAUL L. THURSTON
BY Robert E Burns
ATTORNEY.

Patented June 23, 1953

2,642,732

UNITED STATES PATENT OFFICE 2,642,732

KNITTED ARTICLE OF HOSIERY

Paul L. Thurston, Martinsburg, W. Va., assignor to Interwoven Stocking Company, New Brunswick, N. J., a corporation of New Jersey Application December 26, 1951, Serial No. 263,229

9 Claims. (Cl. 66—179)

1

The present invention relates to knitting, and, particularly to knitting circular seamless fabric. The invention is especially applicable to knitting circular seamless hosiery, for example half hose, socks and anklets for men, ladies and boys.

It is an object of the present invention to produce circular seamless fabric having a plurality of areas disposed one after another in a coursewise direction knit of different yarns, for example yarns of different color, to produce solid color patterns. A wide variety of patterns is possible, for example diamonds, vertical or inclined stripes and bands, rectangular block or panels, zigzag patterns, diagonal patterns, etc.

In accordance with the invention, areas knit of different yarns are united or joined with one another by wrap yarn which is knit partially with one body yarn and partially with another. The wrap yarn extends in a general walewise direction along the boundary between two areas knit of different body yarns and is knit at a plurality of stitches in each course including at least one stitch knit with the body yarn of one area and at least one stitch knit with the body yarn of the adjacent area. Not only does the wrap yarn serve as a connecting link between the adjacent areas but also it can be of a different color from the body yarns so as to provide a colored border for said areas. In accordance with the invention, areas of different color may be disposed one above another in a walewise direction as well as one alongside another in a coursewise direction.

The invention relates to improvements in the fabric structure and also improvements in the method of making the fabric and a new and improved machine for knitting such fabric automatically. The objects, features and characteristics of the invention will be more fully understood from the following description in conjunction with the accompanying drawings which show, by way of example, fabric embodying the invention and a circular knitting machine for producing it.

The method and apparatus for making the fabric of the present application are not herein specifically claimed, as they form the basis of my divisional application, Serial No. 320,285, filed November 13, 1952.

In the drawings:

Fig. 2 is a stitch diagram of a small area of

2 fabric in the leg portion of the sock, as indicated approximately by the broken line II in Fig. 1.

Figures 1, 1A:
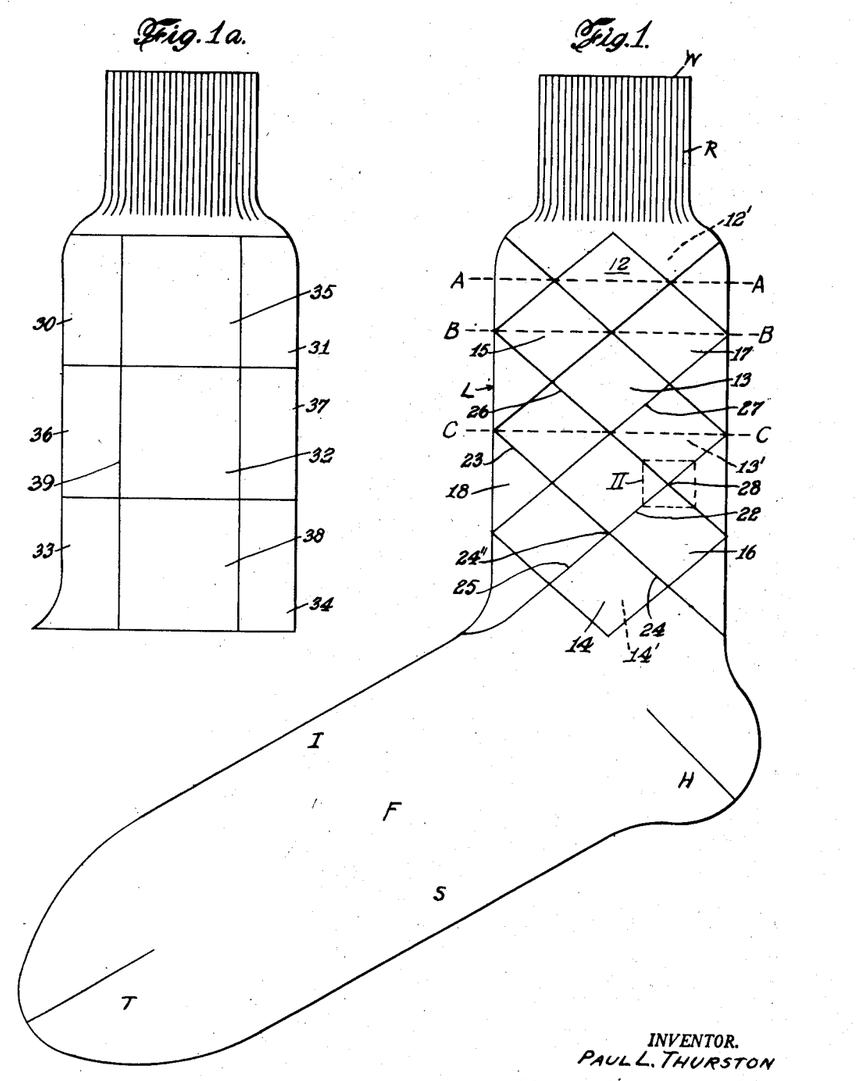
Fig. 1 is a side view of a sock embodying the invention.
Fig. 1a is a partial side view showing another embodiment.
Figure 2:
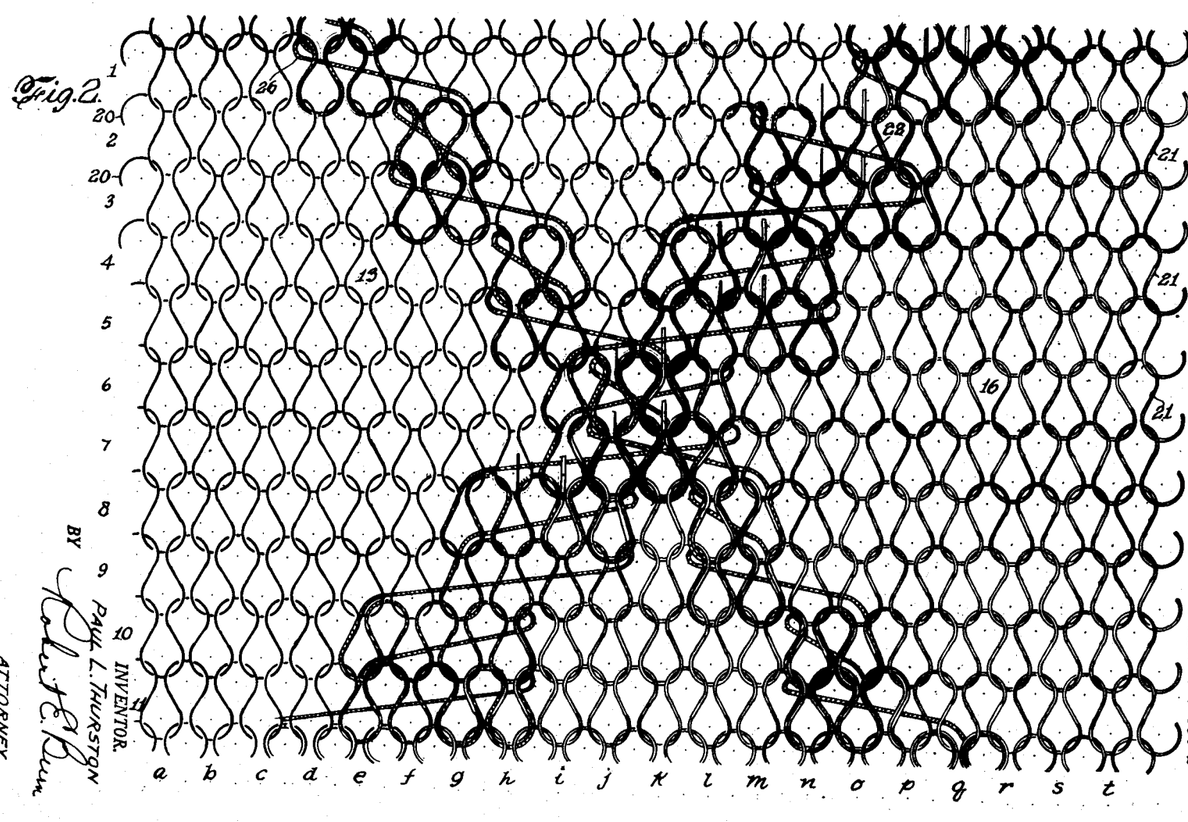

The embodiment of the invention shown, by way of example, in Figs. 1 and 2 is a man's sock having a top R, leg L and foot F with a heel H, instep I, sole S and toe T. The top R has a non-raveling edge or welt W and is formed of fabric having a considerable amount of stretchability and recoverability, for example 1 x 1 or 2 x 2 rib fabric or plain fabric having elastic thread incorporated therein. The leg and foot are plain knit, the leg L, instep I and sole S being formed by continuous round and round circular seamless knitting while the heel H and toe T are knit by reciprocation.

The leg L, and also the instep I if desired, are composed of a plurality of areas knit respectively of different body yarns. The areas are disposed side by side in a coursewise direction so that each of a plurality of successive courses is made up of a plurality of yarns knit sequentially one after another. Areas knit of different yarns may also be disposed one above another in a walewise direction. The areas are of predetermined size and shape, to form the pattern desired. Adjacent areas are united to one another by wrap yarn which extends in a generally walewise direction along the borders between adjacent areas and is knit partly with body yarn of one area and partly with the body yarn of the adjacent area. Thus, the wrap yarn is carried from course to course and knit at a plurality of stitches in each course, including one or more stitches knit of one body yarn and one or more stitches knit of another body yarn.

In the embodiment shown in Figs. 1 and 2, a triangular area 12, a diamond-shaped area 13 and a triangular area 14 are formed of a body yarn which may, for example, be blue. Like areas 12', 13' and 14' on the opposite side of the sock are also knit of the same yarn. Diamond-shaped areas 15 and 16 are knit of a different yarn, for example yellow, while diamond-shaped areas 17 and 18 are knit of still another yarn, for example red, it being understood that half of each of the four last mentioned areas is on the opposite side of the sock. Each course is thus made up of a plurality of body yarns knit successively one after another. Thus, for example, a course approximately on the line A—A in Fig. 1 will comprise, in sequence, a portion knit of red yarn of area 17, a portion knit of blue yarn of area 12', a portion knit of yellow yarn of area 15 and a portion knit of blue yarn of area 12. The sequence of yarn is the same in a plurality of successive courses so that area 17 is formed of successive part-courses of red yarn while areas 12 and 12' are formed of part-courses of blue yarn and area 15 is formed of successive part-courses of yellow yarn. The coursewise extent of each of the body yarn portions varies from course to course. Proceeding downwardly from the line A—A, the extent of the blue yarn portions forming area 12 decreases at both ends while the red and yellow yarn portions forming areas 17 and 15 increase until a line B—B is reached where the red and yellow come together, each forming half of the course. Proceeding from line B—B to line C—C, the extent of the red and yellow yarn portions decreases and that of the blue yarn portions increases. The portions of the courses formed of the same yarn thus end at different wales in succeeding courses, so that the boundary lines between adjacent areas have a coursewise, as well as a walewise, component. At the line C—C, the sequence of the yarns in the course is changed, red yarn occurring in the portion of the course that previously was yellow and yellow yarn occurring in the portion that was previously red. This forms a red area 18 below the yellow area 15 and a yellow area 16 below the red area 17. The yarn sequence may also be changed at other points, if desired, for example to knit the area 13 of a yarn different from that forming the area 12. It will be understood that the several areas knit of different yarns may be of many different sizes and shapes, to provide a wide variety of designs.

The way in which adjacent areas knit of different body yarns are joined is illustrated in Fig. 2 which is an outside stitch diagram of a small portion of fabric including a portion of area 13 knit of a body yarn 20 and an adjacent portion of area 16 knit of body yarn 21. In course 1, the stitches in wales $a$ to $p$ are knit of body yarn 20 while stitches in wales $q$ to $t$ are knit of body yarn 21. In courses 2 and 3, yarn 20 is knit at wales $a$ to $n$ and yarn 21 at wales $o$ to $t$. In courses 4 and 5, yarn 20 is knit at wales $a$ to $l$ and yarn 21 is knit at wales $m$ to $t$, etc. A warp yarn 22 is knit at wales $o$, $p$, $q$ and $r$ in course 1, at wales $m$, $n$, $o$ and $p$ in courses 2 and 3, at wales $k$, $l$, $m$ and $n$ in courses 4 and 5, etc. The wrap yarn 22 is thus carried from course to course and, in each of a plurality of successive courses, is knit at a plurality of wales with stitches of the body yarn, including one or more stitches of the body yarn 20 forming the area 13 and one or more stitches of the body yarn 21 forming the area 16. The wrap yarn thus acts as a connecting link between an area knit of one body yarn and an adjacent area knit of another body yarn. In like manner, a wrap yarn 23 (Fig. 1) serves as a connecting link between areas 13 and 18. At a point 24', the two wrap yarns converge and are knit together. They either cross at point 24' or again diverge. In other words, wrap yarn portions 24 and 25 may either be continuations of 22 and 23, respectively, or continuations of 23 and 22, respectively. Other areas knit of different yarns are joined with one another in like manner. The wrap yarn may be of the same color as one or more of the body yarns but preferably is of a different color and is knit in plating relation with the body yarns so that it comes to the outer face of the fabric. In addition to connecting adjacent areas knit of different body yarn with one another, the wrap yarn thus provides a decorative border framing the respective areas. As illustrated in Fig. 1, additional wrap yarns 26 and 27 form a wrap embroidery pattern that divides area 13 into four smaller diamonds. At point 28, wrap yarn 26 crosses wrap yarn 22 that joins areas 13 and 16. A portion of the wrap yarn 26 appears in Fig. 2 where it is knit in plating relation with the body yarn at wales $d$ and $e$ in course 1, wales $f$ and $g$ in courses 2 and 3, etc. Other wrap embroidery patterns may be provided on the fabric, as desired.

In Fig. 1a, there is shown another design in which tubular seamless fabric forming the leg portion of a sock is composed of rectangular panels or blocks knit of different body yarn. For example, areas 30, 31, 32, 33 and 34 are knit of blue yarn while areas 35, 36, 37 and 38 are knit of red yarn. Alternate areas, such as 30 and 31, may be knit from the same end of yarn while intervening areas are knit of different yarn. Alternatively, each of the yarns in a course may be different from the others. Wrap yarns 39 extending in a walewise direction and each knit partly with the body yarn of one area and partly with the body yarn of an adjacent area serve as connecting links between the respective areas knit of different body yarns. It will be understood that a wide variety of patterns is made possible by the construction in accordance with the invention. Where desired the pattern is extended in the instep portion of the sock as well as in the leg portion.

In Figs. 3 to 12 of the drawings, there is illustrated, by way of example, a circular knitting machine for carrying out my invention, portions of the machine being omitted to simplify the drawings. The machine illustrated in the drawings comprises a rotating needle cylinder carrying a circular series of independently operable latch needles, means for feeding a plurality of body yarns sequentially to successive sections of needles during each of successive revolutions of the needle cylinder so as to feed one body yarn to the needles in one section of the needle circle and another body yarn to the needles of a succeeding section of the needle circle, etc., means for feeding wrap yarns to spaced groups of needles overlapping respectively the division point between successive sections that receive different body yarns, each of said groups including at least one needle in one of said sections and at least one needle in an adjacent section, means for varying the division of the needles into said sections and coordinated means for correspondingly varying said groups so that they continue to overlap the division points between successive sections, and means for actuating the needles to knit the body yarns and wrap yarns together so that each of a plurality of courses is formed of a plurality of sections knit respectively of different body yarns and said wrap yarns serve as connecting links tying said sections together.

The needle cylinder 40 (Fig. 6) carries a circular series of independent needles 41 which are vertically slideable in parallel slots or tricks provided in the needl cylinder. Each needle has a hook 42 (Fig. 12), latch 43 and a butt 44 which cooperates with suitable cams (Fig. 11) to slide the needle up and down in its trick as the needle cylinder rotates. The needle cylinder is rotatably supported by the frame or base of the machine and is both rotatable and oscillatable by suitable driving mechanism (not shown). The machine has a sinker cap 46 with suitable sinkers that cooperate with the needles to draw stitches and a latch ring 47 that assists in controlling the needle latches.

Figure 3:
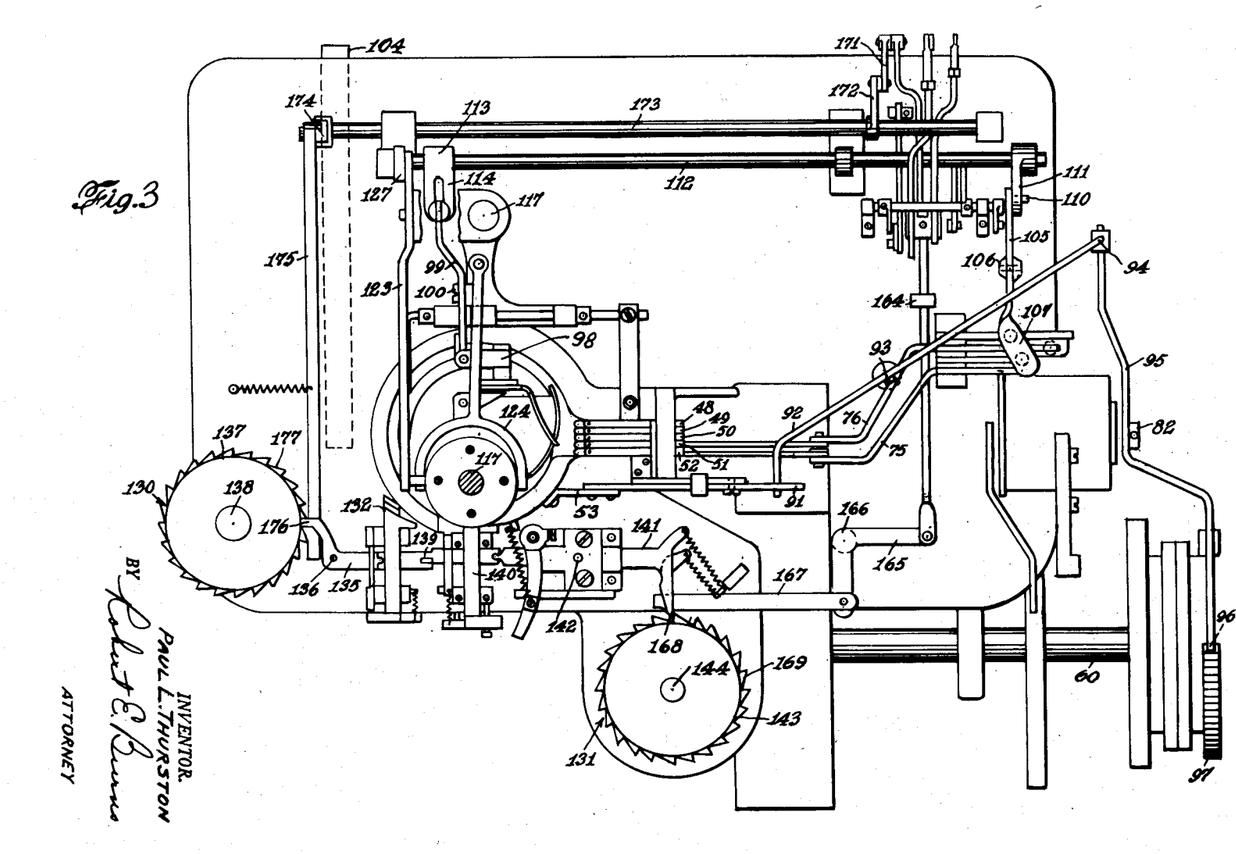
Fig. 3 is a plan of a circular knitting machine for carrying out the invention.

Body yarn is fed to the needles of the machine by a plurality of yarn-feeding guides 48, 49, 50, 51 and 52 which are disposed side by side at the main feeding station or throat plate of the machine and an additional yarn-feeding guide 53 (Fig. 3) which is located ahead of the other yarn guides, the direction of rotation of the needle cylinder being counterclockwise as viewed in Fig. 3. Yarn guides 48, 49 and 50 are swingable about a common pivot shaft 54 (Fig. 4) so as to be movable into and out of yarn feeding position. The yarn guides are biased so as to be normally in predetermined feeding position and are movable upwardly to an inoperative position by means of pivoted levers 55, links 56 and pivoted cam followers 57 that cooperate respectively with cams 58 on the main pattern drum shaft 60. The several yarn guides are thus controlled by the cams 58 so as to be in operative position during certain portions of the knitting operation. For example, one of said yarn guides may carry yarn in knitting the top portion of a sock, another the yarn used in the heel and toe, etc.

Yarn guides 51 and 52 are similarly controlled by cams 58 on the main pattern drum shaft 60. In addition, these two yarn guides are actuated by mechanism for "pumping" them into and out of operative position during each of a plurality of successive rotations of the needle cylinder in such manner that one of the yarn guides is in feeding position during a portion of a revolution and the other is in feeding position during another portion of the same revolution. This mechanism comprises an auxiliary cam drum 61 which rotates in synchronism with the needle cylinder, being shown mounted on the main shaft 59 of the machine (Figs. 4, 5, 7 and 8). The cam drum 61 carries a plurality of arcuate cam sections 62, 63, 64 and 65 of which cams 62 and 65 are shown on one side of the drum and cams 63 and 64 on the opposite side. The cam drum cooperates with a cam follower assembly comprising two cam follower levers 66 and 67 which are swingable about a fixed stud or shaft 68 parallel to the axis of the cam drum 61 (Figs. 7 and 8), a collar 69 spacing these two levers and a bracket 70 carrying at its outer end a plurality of spaced pins 71 that guide the outer ends of the cam follower levers 66 and 67. The entire assembly, including the cam follower levers 66 and 67, the collar 69 and bracket 70, is slidable axially on the stud 68 between a first position in which the cam levers engage cam segments 62 and 64, respectively, and a second position in which the cam levers engage cams 63 and 65, respectively. The levers are shifted from one position to another by means of a pin 72 under control of pattern mechanism described below.

The cam follower lever 66 acts through a vertically slidable tappet 73 on levers 75 and 75' (Figs. 4 and 5) while the cam follower lever 67 acts through a similar tappet 74 on levers 76 and 76', all of said levers being pivoted at 77. The tappets engage lateral projections 75a, 76a (Fig. 7) on levers 75', 76', which projections in turn engage levers 75, 76 so that each tappet raises both of the associated levers while the levers also are movable independently. The opposite ends of the levers 75 and 76 are connected by links 78 to the respective levers 55 that actuate the yarn guides 51 and 52. Lateral extensions 66' and 67' on the cam follower levers 66 and 67, respectively, provide bearing surfaces for engagement of the lower ends of the tappets 73 and 74 in all positions of the cam follower levers. When one of the cam followers 66, 67 rides up on one of the cam segments on cam drum 61, the corresponding tappet 73, 74 is raised, rocking the respective lever 75, 76 in a counterclockwise direction, as viewed in Fig. 4, and acting through one of the links 78 to swing the corresponding lever 55 in a clockwise direction, thereby lifting the associated yarn guide 51, 52 out of feeding position. The yarn guides 51, 52 are thus controlled by the cam segments on the cam drum 61, the length and position of the respective segments being chosen so as to move the yarn guides from operative to inoperative position in predetermined timed relationship with the rotation of the needle cylinder. With the cam arrangement shown, one of the yarn guides will be in operative position for approximately half a revolution of the needle cylinder and the other yarn guide will be in operative position for approximately the other half of the revolution. When the cam follower levers 66 and 67 are shifted axially from the position shown in the drawings (Fig. 8) to a position in which they engage cam segments 62 and 64, respectively, the sequence of operation of the corresponding yarn guides is reversed so that yarn guide 52 feeds yarn to selected needles in the section of the needle cylinder previously served by yarn guide 51, and vice versa.

The axial shifting of the cam follower levers 66 and 67 from one position to another is controlled by a suitable cam 80 (Fig. 4) on the main pattern drum shaft 60 acting through a cam follower 81 which is pivoted at 82 (Fig. 5) and is connected by a link 83 with one arm of a bell crank 84, the other arm of which is slotted and engages the pin 72 of the cam follower lever assembly. When the cam follower 81 rises up on a high segment of cam 80, the link 83 moves upwardly, rocking the bell crank 84 in a clockwise direction, as viewed in Fig. 4, and thereby shifting the pin 72 and associated cam follower levers 66 and 67 to the left. A spring 85 (Fig. 4) biases the link 83 and cam follower 81 in the opposite direction.

Figure 4:
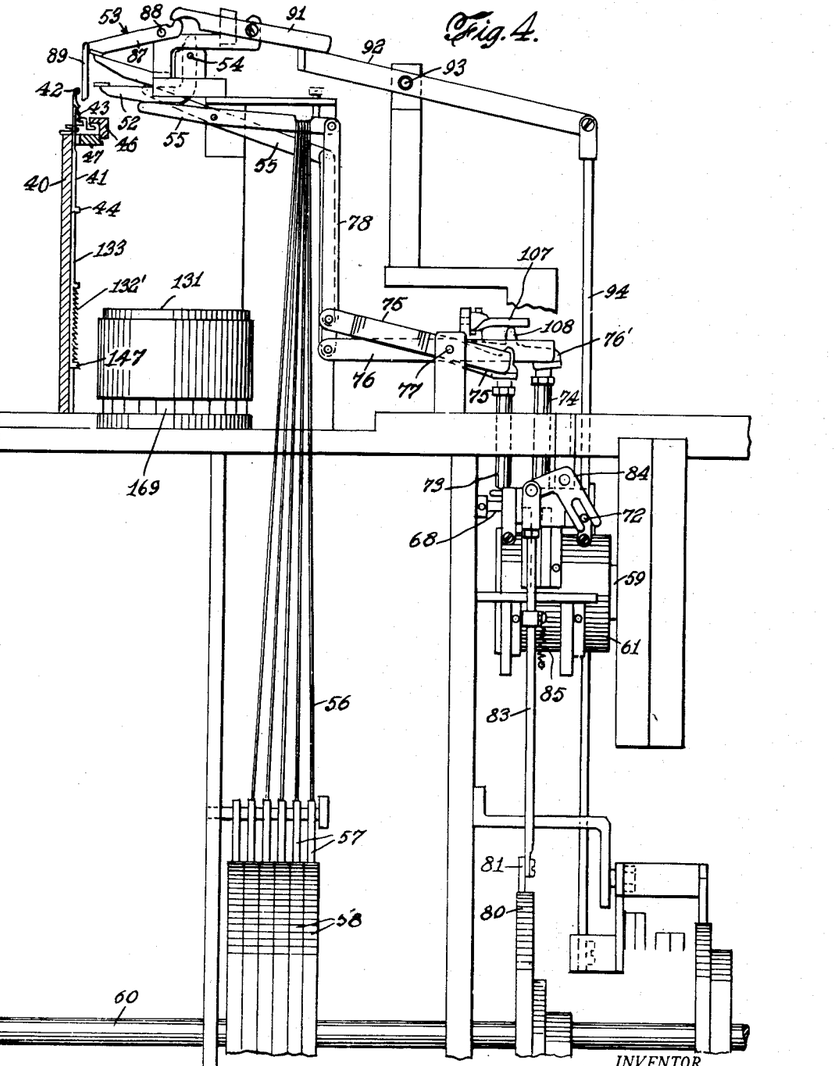
Fig. 4 is a front elevation of the machine.
Figure 5:
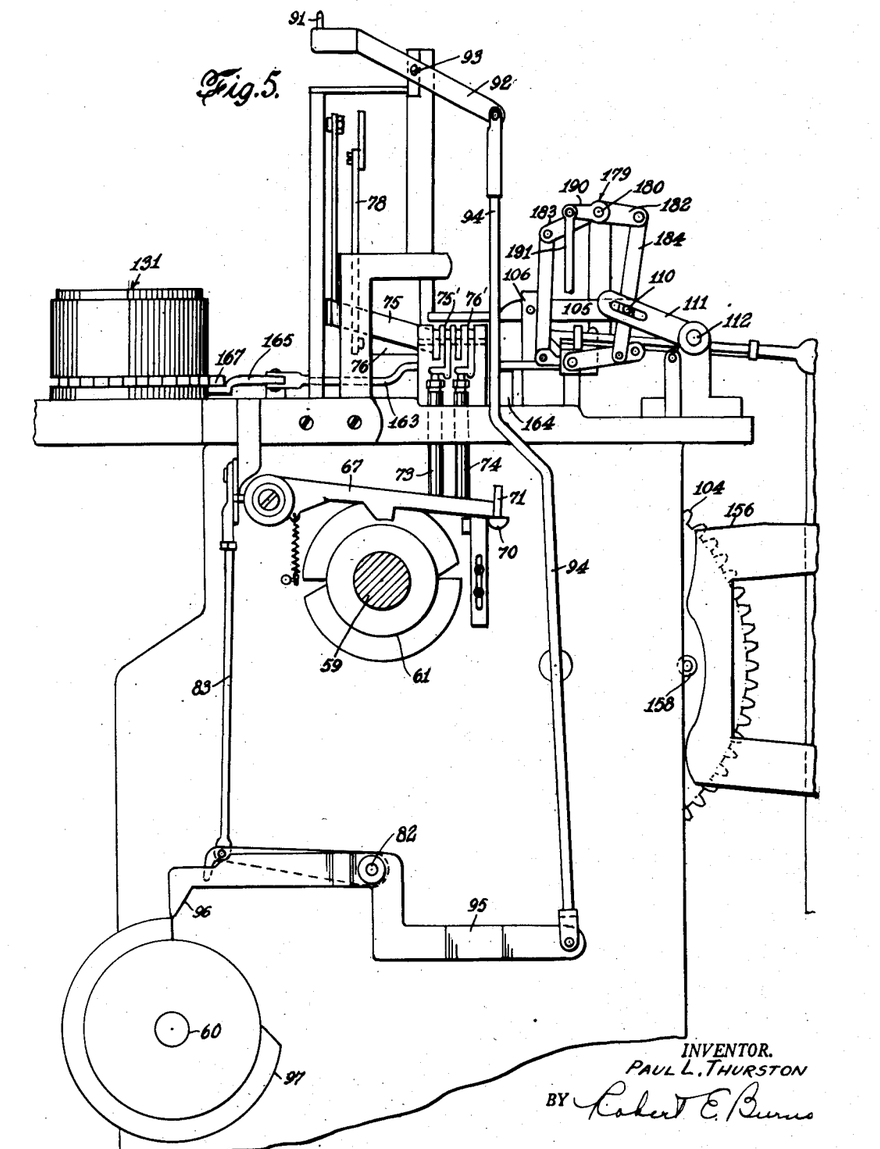
Fig. 5 is a right side elevation of the machine.

The additional yarn guide 53 located ahead of the other yarn guides 48—52 is movable into and out of yarn feeding position under control of pattern mechanism. As shown in Figs. 3 and 4, the yarn guide 53 comprises an arm 87 which is pivoted at 88 on a suitable support and at its inner end carries a downwardly projecting finger 89 which has a yarn feeding opening at its lower end. The finger 89 may advantageously be a small tube down through which the yarn is fed. When the yarn guide 53 is in feeding position, the finger 89 extends down inside the latch ring and the yarn feeding opening is at a level different from that of the yarn feeding guides 48—52, being preferably lower. The yarn guide 53 is biased to move to yarn feeding position and is swingable to an inoperative position by a pivoted lever 91 which engages the rear end of the pivoted lever 87 and is, in turn, engaged by the forward end of a bent lever 92 which is pivotally supported at 93. The rear end of the lever 92 is connected by a link 94 (Fig. 5) with the rear end of a cam follower 95 pivotally supported at 82 and having a nose portion 96 adapted to engage a cam 97 on the main pattern drum shaft 60. When the nose 96 of the cam follower 95 rides up on a high portion of the cam 97, the link 94 moves downwardly, rocking lever 92 in a clockwise direction (Figs. 4, 5), which rocks lever 91 in a counterclockwise direction and the pivoted arm 87 of yarn guide 53 in a clockwise direction to raise the yarn feeding finger 89.

When yarn changes are made by movement of the yarn feeding guides 48—53 into and out of operative position, the yarns are cut and bound of by a cutter and binder unit 98 of usual or desired construction mounted on the latch ring 47 and positioned above the needle cylinder. The cutter and binder unit is operated by an arm 99 which is pivotally mounted on the latch ring 47 at 100. The inner end of the pivoted arm 99 is connected to an operating member of the cutter and binder by a link 101. The outer end of the arm 99 is connected by a link 102 and other suitable linkage (not shown) to a cam follower engageable by a cam on the main pattern drum in usual or desired manner. The cutter and binder is thereby operated from the main pattern drum in timed relation with the movement of the yarn guides 48—53 which are likewise controlled by cams on the main pattern drum shaft.

The cutter and binder 98 is also operated cyclically in timed relation with the "pumping" of yarn guides 51 and 52.

For this purpose, a rocking lever 105 (Figs. 3 and 5) is pivotally supported at 106 and has an end portion 107 which overlies upwardly projecting protuberances 108 (Fig. 7) provided on each of the pivoted levers 75'—76' (Fig. 4) which are part of the linkage operating yarn guides 51 and 52. The other end of the pivoted lever 105 has a pin and slot connection 110 with an arm 111 on an oscillatably supported rock shaft 112 that extends across the back of the machine. Near its left hand end, the rock shaft 112 carries a second arm 113 (Fig. 6), the outer end of which is slotted and straddles the link 102 for operating the cutter and binder. Adjustable collars 114 are provided on the link 102 above and below the forked end of the arm 113. When the outer end of one of the yarn finger operating levers 75, 76 is raised by one of the tappets 73, 74 to move the corresponding yarn guides 51, 52 out of operative position, the forward end 107 of the pivoted lever 105 is also raised so that its rear end is depressed and—by the pin and slot connection 110—turns the rock shaft 112 in a clockwise direction, as viewed in Fig. 6, so as to move the link 102 downwardly and thereby actuate the cutter.

Wrap yarn is fed to selected groups of needles by means of a wrap head 116 carried by a rotatable shaft 117 (Figs. 3 and 6) which is rotated in synchronism with the needle cylinder but is offset forwardly and to the left from the axis of the needle cylinder. The wrap head 116 comprises two discs 118, 119 which are carried at the lower end of the shaft 117, being rotatable, at least to a limited extent, relative to the shaft 117 and each other. Each of the discs 118, 119 carries one or more downwardly projecting yarn guides 120 which are removably mounted on the discs in such manner that they may be placed at any desired position around the peripheries of the discs. Above the discs 118, 119, there are two coaxial sleeves 121, 122 which rotate with the shaft 117 but are slidable axially relative to the shaft and each other. Each of the sleeves 121, 122 is connected, respectively, with one of the discs 118, 119 by a spiral slot and pin connection so that axial movement of the sleeves produces angular movement of the respective discs so as to change the phase relation of the discs relative to the shaft 117 and each other. The vertical positions of the sleeves 121, 122, and hence the angular positions of the respective discs 118, 119 relative to the rotating shaft 117 and each other, is controlled by means of pivoted levers 123, 124 carrying pins engageable with grooved collars 125, 126 provided respectively on the vertically slidable sleeves 121, 122. The levers 123, 124 are connected respectively by links 127, 128 and other suitable linkage (not shown) with pattern mechanism, e. g. the main pattern drum, for shifting the phase relation of the discs 118, 119 in accordance with the pattern being produced. The relation between the radius of the discs 118, 119 and the distance the axis of the shaft 117 is offset from the axis of the needle cylinder is such that the path of the yarn guides 120 crosses the path of the needles so that the yarn guides are outside the needle circle for a predetermined arc, being otherwise inside the needle circle. Since the peripheral speed of the needles is greater than that of the yarn guides 120 because of the greater radius of the needle cylinder, the needles gain on the yarn guides 120 while the latter are outside the needle circle so that a predetermined number of needles pass a yarn guide before the latter crosses back to the inside of the needle circle. A yarn fed by the yarn guide is thus, in effect, "wrapped" about any of said needles that are raised to receive it. Shifting the phase relation of the discs 118, 119 causes the respective yarn guides 120 to wrap different groups of needles. Wrap yarn is supplied to the yarn guides 120 from spools (not shown) carried by a suitable rack that rotates with the shaft 117, the yarns passing down through suitable apertures in the collars 125 and 126.

The selecting of needles to receive the wrap yarns and the division of the needle circle into sections to receive the respective body yarns are effected by coordinated needle-selecting units 130 and 131 (Fig. 3). The selecting unit 130 comprises a stack of selecting cams 132 (see also Fig. 11) which are movable toward and away from the needle cylinder and, when moved in toward the cylinder, are adapted to engage selecting butts 132' (Figs. 4 and 6) on jacks 133 which are provided below the needles 41 in the needle cylinder 40. While butts are shown on the jacks at all of the levels corresponding to the selecting cams 132, it will be understood that any one jack usually has one or more butts while other jacks have butts at other levels. The butt-engaging portions of the selecting cams 132 are inclined upwardly in the direction of movement of the jacks so that, when a selecting cam is moved inwardly to operative position, any jack having a butt at the level of said cam will be raised, thereby raising the corresponding needles above the other needles to receive wrap yarn fed by the wrap head 116.

The selecting cams 132 are biased to move into operative position. They are selectively withdrawn to inoperative position by bell crank levers 135 which are pivoted at 136. The levers 135 are connected at one end with the selecting cams 132, for example by a tongue and recess connection while at the other end the levers are adapted to be engaged by pins or other protuberances on a selecting drum 137 which is rotatable about a vertical axis 138. By mechanism described below, the drum 137 is racked with a step-by-step rotary movement in timed relation with the rotation of the needle cylinder. Where a pin occurs on the drum 137, engagement of the pin with the lever 135 causes the lever to be rocked in a clockwise direction, as viewed in Fig. 3, thereby withdrawing the corresponding selecting cams 132. Where no pins occur, the levers 135 are not rocked and the corresponding selecting cams 132 remain in operative position.

The selecting unit 131 comprises a stack of selecting cams 140 (Figs. 3 and 11) which are movable toward and away from the needle cylinder and, when in their inner position, are adapted to engage corresponding selecting butts 132' on the jacks 133. The butt-engaging inner ends of the cams are inclined upwardly in the direction of movement of the jacks so as to raise the jacks and corresponding needles. The selecting cams 140 are biased toward their inner position and are selectively withdrawn by means of corresponding levers 141 pivoted at 142. At one end, the levers are connected with the selecting cams 140, for example by a tongue and recess connection, while at the other end the levers are adapted to be engaged by pins or other protuberances provided at corresponding levels on a selecting drum 143 which is rotatable about a vertical axis 144. The selecting drum 143 and associated selecting cams 140 control the division of the needles in the needle circle into a plurality of sections, the needles of one section being positioned at a different level from those of an adjacent section and the yarn guides that feed the body yarns being positioned with respect to the levels of the needles so that the needles of one section will receive one body yarn while the needles of an adjacent section will receive a different body yarn. Still further flexibility of control is afforded by providing interengaging portions 139 on all or selected ones of the cams 132 and 140 so that, by withdrawing one cam a greater distance, the corresponding cam of the other set is also withdrawn. The distance the cams are withdrawn is controlled by the heights of the pins on drums 137 and 143.

Figure 11:
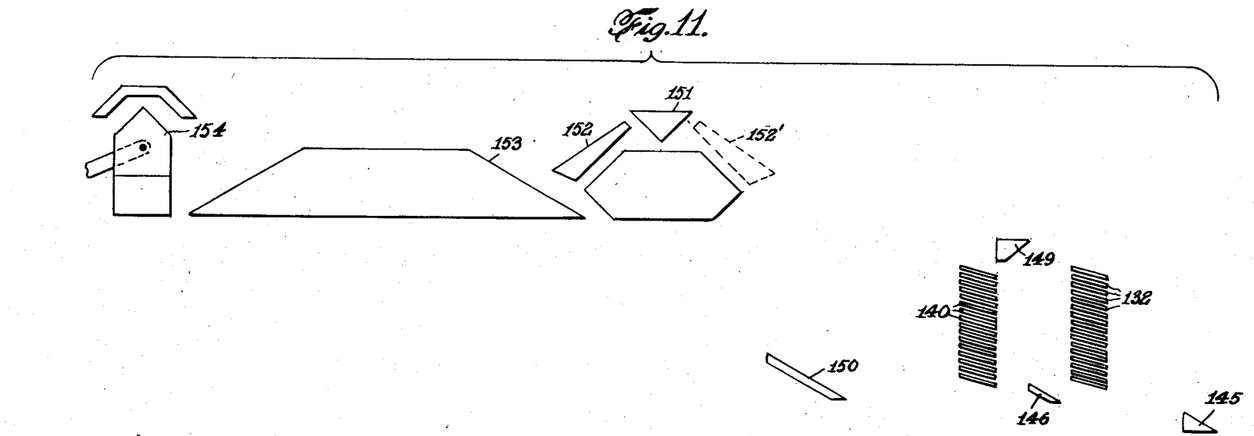
Fig. 11 is a developed view of needle-selecting and operating cams.
Figure 12:
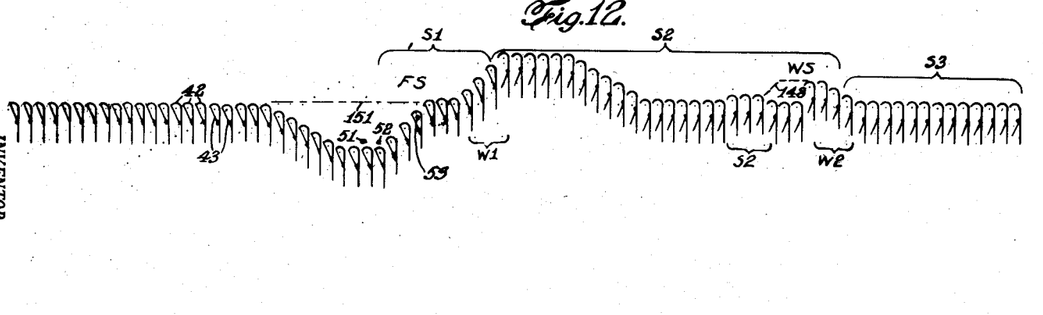
Fig. 12 is a schematic view illustrating the paths followed by the needles.

The manner in which the needles are selected and divided is illustrated diagrammatically in Fig. 12 in conjunction with Fig. 11 which shows the needle-selecting and -operating cams. The needle jacks are first leveled by a cam 145 which engages leveling butts 147 (Fig. 4) on the jacks. Selected jacks are then raised by selecting cams 132 (Fig. 11) and a booster cam 146 to raise selected groups of needles to wrapping level to receive wrap yarn. In Fig. 12, a group of four needles $W_2$ is shown being raised to receive wrap yarn at the wrapping station WS. The path followed by the raised needles is indicated by the broken line 148. The other needles are not raised and continue at the original level. A group of four needles $W_1$ has previously been raised and has received a wrap yarn. Following the booster cam 146, the jacks of the needles that have been raised are lowered by a levelling cam 149 (Fig. 11) engaging jack-levelling needle butts 147, while the corresponding needles remain—by friction—at wrapping height. The jacks of a selected section $S_2$ are then raised by selecting cams 140 and a booster cam 150 to position corresponding needles higher than those of a preceding section $S_1$ and a succeeding section $S_3$ and also higher than wrapping level. The booster cam 150 is located beyond the wrapping station but ahead of the feeding station FS at which the body yarns are fed. The path of the needles of section $S_2$ is indicated by the broken line 151. As the yarn guide 53 is lower than the yarn guides 51 and 52, the needles of sections $S_1$ and $S_3$—including the end needles that have been raised to wrapping level—receive in their hooks the body yarn fed by guide 53 but pass below yarn guides 51 and 52 and hence do not take yarn fed by either of the two latter guides. The needles of section $S_2$, being higher at the feeding station FS, take the yarn fed by one or another of the yarn guides 51, 52; while yarn fed by guide 53 lies below the latches of the needles of section $S_2$ and is cast off when the needles pass through the knitting wave. As explained above, the yarn guides 51 and 52 are moved alternately into and out of feeding position so that one or the other of these guides feeds yarn to those needles that are positioned to receive it. Thus, for example, guide 51 feeds yarn to the needles of section $S_2$ while yarn guide 52 feeds yarn to the needles of a section following $S_3$. It will be noted that the groups of needles receiving wrap yarn occur at the junctions between the sections into which the needles are divided to receive different body yarns. Thus, for example, two of the needles of the group $W_1$ that receive wrap yarn are in section $S_1$ while the other two needles of this group are in section $S_2$. The wrap yarn thereby provides a connecting link between the different sections of body yarn.

After wrap yarn and body yarn have been fed selectively to the needles, as described above, all of the needles are operated to draw stitches and subsequently clear the stitches that have been drawn, as, for example, by means of a center cam 151 (Fig. 11), stitch cam 152, raising cam 153 and clearing cam 154. A reverse stitch cam 152' is in operative position only when the machine operates by reciprocation, as in knitting the heel and toe.

The selecting drums 137 and 143 are racked in timed relation with the rotation of the needle cylinder, being moved each revolution or spaced revolutions, as desired. The racking normally occurs at a predetermined point in the rotation of the needle cylinder. However, if a selecting drum is being racked at the same time that a needle selection is being made by engagement of the selecting cams 132, 140 with the jacks, an improper selection may be made. To overcome this difficulty, provision is made for shifting the point at which the selecting drums are racked, so that the racking does not occur at the same time that the selecting cams are in engagement with butts on the jacks.

As illustrated in the drawings (Figs. 3, 5, 9 and 10), the racking mechanism comprises a pair of levers 156 and 157 swingable about a common pivotal support 155 and each having a cam surface engageable, respectively, by rollers 158 and 159 provided, respectively, on opposite sides of the "104" gear 104 which rotates once every four revolutions of the needle cylinder. The rollers 159 are angularly spaced from the rollers 158, for example by an angle of 22½° which corresponds to an angle of rotation of 90° of the needle cylinder. The number of rollers provided determines whether the selecting drums are racked each revolution of the needle cylinder, every other revolution, etc. Engagement of the rollers 158, 159 with the levers 156, 157, respectively, swings the levers in a clockwise direction, as viewed in Fig. 9, springs being provided to return the levers, which are thereby caused to oscillate by the rotation of the 104 gear. Owing to the angular spacing of the rollers 158 and 159, the levers 156 and 157 oscillate out of phase with one another.

Links 160 and 161 are pivotally connected at one end with the upper ends of levers 156 and 157, respectively, and at their other ends are provided with hooks adapted to engage a block 162 adjustably fixed, for example by means of a set screw, on a rod 163 which is slidably supported by a bearing 164 for endwise movement. The rod 163 extends toward the front of the machine and, at its forward end, is pivotally connected with one arm of a bell crank lever 165 swingable about a fixed axis 166, the other arm being pivotally connected with a reciprocable link 167 carrying a pawl 168 adapted to engage the teeth of a ratchet 169 on the selecting drum 143 (Fig. 3), the pawl being biased into engagement with the ratchet teeth.

The rod 163 also extends rearwardly and, at its rear end, is connected by a link 171 with an arm 172 (Fig. 10) on a rock shaft 173 which is oscillatably supported and extends across the back of the machine (Fig. 3). At the left hand side of the machine, the rock shaft 173 is provided with a second arm 174 to which is pivotally connected one end of a reciprocable link 175 which carries a pawl tooth 176 adapted to engage the teeth of a ratchet 177 on the selecting drum 137.

Pattern control mechanism 179 is provided for raising one or the other of the links 160 and 161 so that the hook of one of said links engages the block 162 on the rod 163 while the other hook is held up out of engagement with said block. As illustrated in the drawings (Figs. 9 and 10), this mechanism comprises a rock shaft 180 which is oscillatably supported by brackets 181 and carries two laterally projecting arms 182 and 183 which project from opposite sides of the rock shaft. The arms 182 and 183 are connected, respectively, by links 184 and 185 to pivotally mounted lifting arms 186 and 187 provided, respectively, with laterally projecting pins 188 and 189 (Fig. 10) which extend under and are adapted to lift links 160 and 161. The rock shaft 180 also has a third arm 190 which is connected by a link 191 with a cam follower 192 which is pivotally supported at 82 and has a nose portion 193 adapted to engage a cam 194 on the main pattern drum shaft 60. When the cam follower 192 rides up on a high portion of the cam 194, the link 191 moves downwardly (Fig. 9), rocking the shaft 180 in a counterclockwise direction and lifting arm 182 and connected arm 186 to raise the link 160 out of engagement with the block 162. The hook of link 161 engages the block 162 and thereby reciprocates the rod 163 in timed relation with the lever 157. Conversely, when the shaft 180 is rocked in the opposite direction, link 161 is raised so that the rod 163 is reciprocated by the lever 156. Since the levers 156 and 157 are actuated out of phase with one another owing to the angular spacing of the rollers 158 and 159 on the 104 gear 104, the rod 163 which actuates the racking of the selecting drums 137 and 143 is operated in different phase relation with the rotation of the needle cylinder, depending on whether it is operated by lever 156 or by lever 157. The phase relation between the racking of the selecting drums and the rotation of the needle cylinder is thus shifted under control of the cam 194 on the main pattern drum shaft 60.

Figure 6:
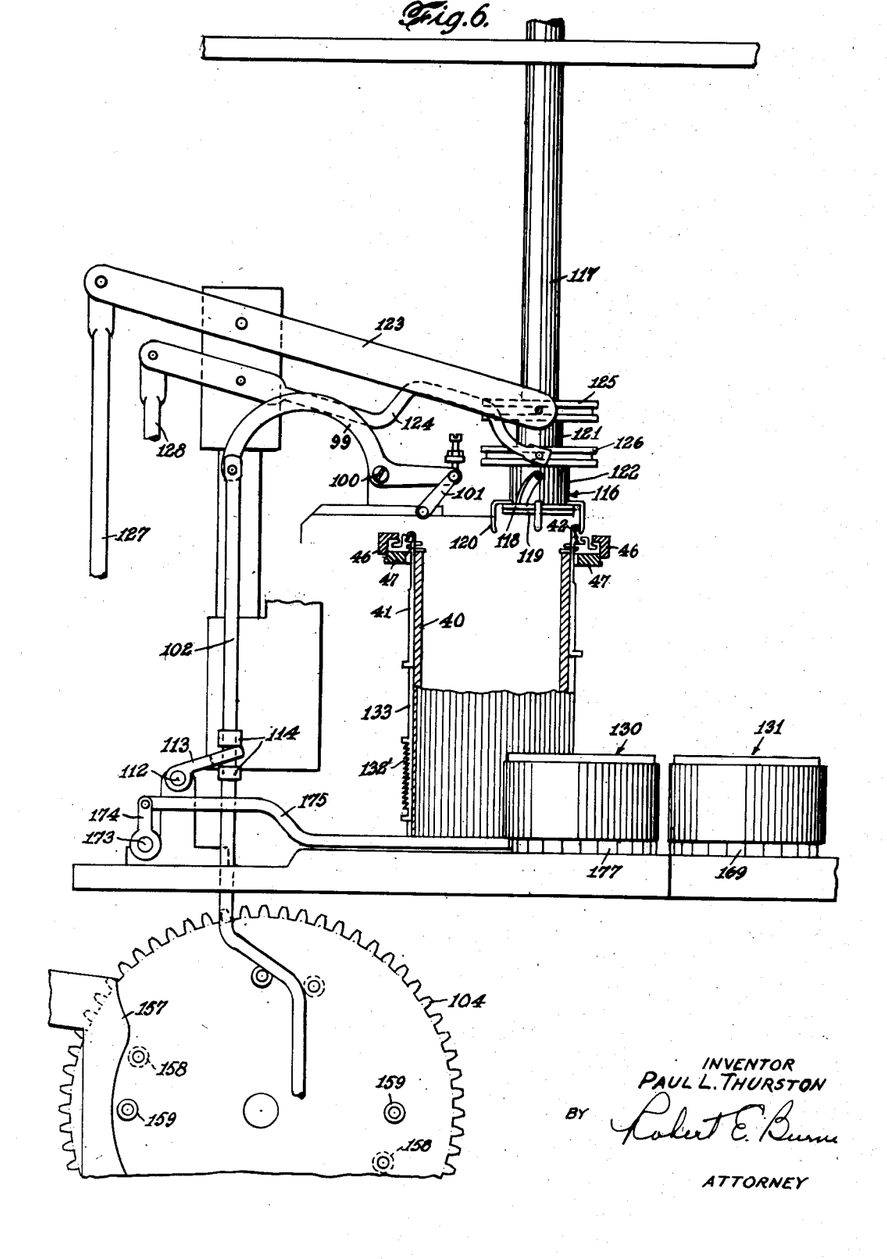
Fig. 6 is a left side elevation.
Figures 7, 8:
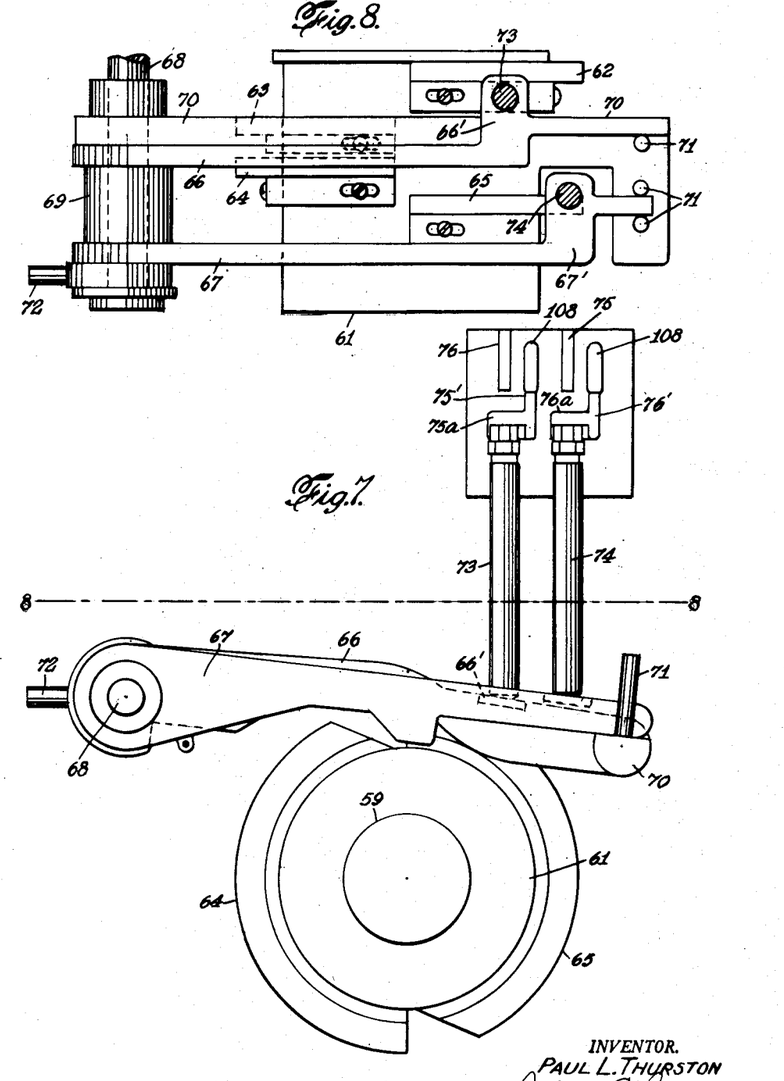
Fig. 7 is an enlarged view of a portion of the mechanism shown in Fig. 5.
Fig. 8 is a plan, partially in horizontal section, of the mechanism shown in Fig. 7, the section being taken approximately on the line 8—8 in Fig. 7.
Figure 9:
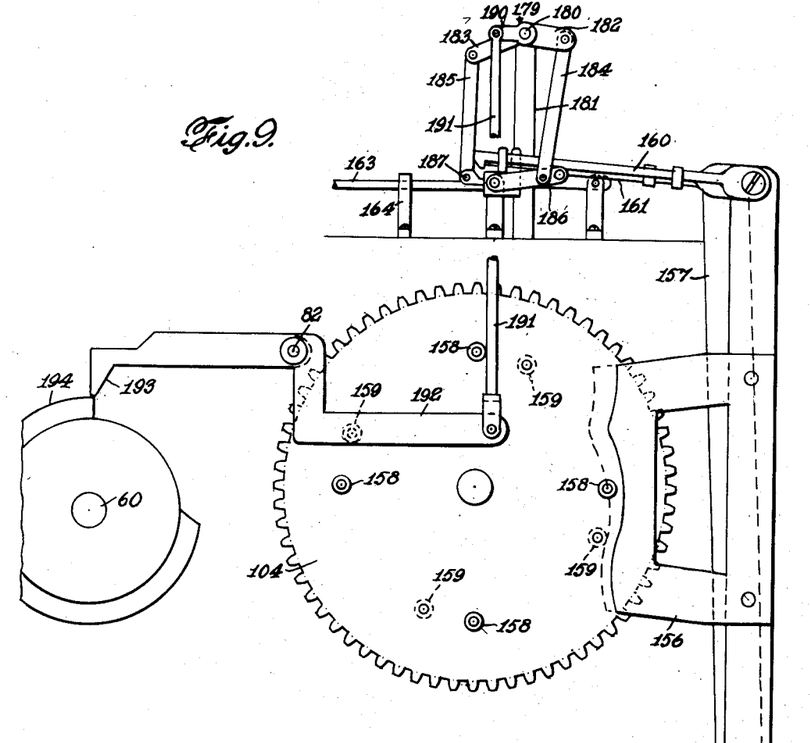
Fig. 9 is a right side view similar to Fig. 5 but with portions of the machine removed.
Figure 10:
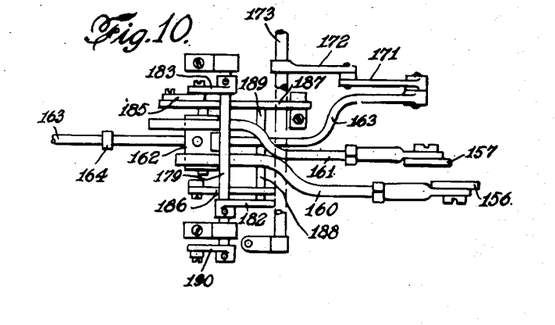
Fig. 10 is a plan of the mechanism shown in Fig. 9.

The operation of the machine will be readily understood from the following description of the steps in knitting an article of hosiery like that shown in Fig. 1. If the top portion R is formed of rib fabric, it is knitted on a rib-knitting machine and transferred to needles of the machine illustrated in the drawing. If it is a plain knit elastic top, it is knit on the present machine, for example by feeding body yarn to the needles with one of the yarn guides 48, 49 or 50 while introducing elastic thread by a suitable feed finger. For knitting the leg portion with the colors described above, the yarn guide 51 is threaded with yellow yarn, guide 52 with red yarn and guide 53 with blue yarn. The yarn guide 53 stays in feeding position throughout the knitting of the leg portion L. Yarn guides 51 and 52 are pumped alternately into and out of feeding position, each being in feeding position approximately half a revolution of the needle cylinder. For example, for knitting a course approximately at the line A—A (Fig. 1), the yarn guide 51 is in feeding position to supply yellow yarn to the needles knitting the section 15 while yarn guide 52 is in feeding position to supply red yarn to the needles knitting section 17. The needles knitting sections 12 and 12' pass too low to take yarn fed by either of the yarn guides 51 or 52 and hence take only yarn fed by the guide 53, as illustrated by the needles of the section $S_1$ in Fig. 12. The division of the needles into the respective sections is controlled by the selecting means 131 (Fig. 3) in such manner that the junction between the sections of the fabric extends along a diagonal line to provide the diamond pattern illustrated. The wrap yarns 22 and 23 are fed by yarn guides on the discs 118 and 119, respectively, of the wrap head 116 (Fig. 6). These discs are progressively turned in opposite directions relative to the shaft 117 so that the wrapping follows the diagonal lines of the junctions between the sections of fabric knit of different body yarn. The wrap yarns 26 and 27 are fed by other yarn guides on the discs 118 and 119. The selection of needles to receive the wrap yarn is effected by the selecting means 130 (Fig. 3). The selecting means 130 and 131 are coordinated with one another so that the groups of needles selected by the selecting means 130 occur at the junctions between the sections into which the needles are divided by the selecting means, being partly in one section and partly in the adjacent section. As the wrap lines on the fabric extend diagonally, they would, at certain times, coincide with the point at which the selecting drums 137 and 143 are racked if these drums were always racked at the same point in the rotation of the needle cylinder. However, by shifting the phase relation between the racking of the selecting drums and the rotation of the needle cylinder by means of the mechanism illustrated in Figs. 9 and 10, this difficulty is avoided.

By providing the machine with a knot tier— known per se—the yarn used for knitting sections 12 and 12' (Fig. 1) can be tied on to a different yarn for knitting sections 13 and 13' so that the section 13 is knit of a different yarn from section 12. In like manner, when the lower point of section 13 is reached, a different yarn can be tied on for knitting sections 14 and 14'. When the line C—C is reached, the alternation of feed fingers 51 and 52 is reversed so that yarn guide 52 feeds yarn to the needles knitting section 18 while yarn guide 51 feeds yarn to the needles knitting section 16.

When the heel H is reached, yarn guides 51, 52 and 53 are moved to inoperative position and one of the yarn guides 48—50 is moved into feeding position, the machine being operated by reciprocation, with suitable narrowing and widening to provide a heel pocket. Upon completion of the heel, the machine is again operated by continuous rotary motion and one of yarn guides 48, 49, 50 or 53 is moved into feeding position to supply to the needles the yarn for knitting the foot portion F. The toe pocket is formed in the same manner as the heel and is followed by the usual looper's edge. It will be understood that, instead of using single yarns, two or more ends of yarn may be knit together.

While the operation of the machine has been described with reference to the knitting of a particular article, it will be understood that the invention is in no way limited to the particular knitted articles or the particular machine details shown by way of example in the drawings.

What I claim and desire to secure by Letters Patent is:

1. In an article of hosiery, a circular seamless leg portion comprising a plurality of circular knit courses, each of successive courses comprising a portion knit of one body yarn, a second portion knit of a different body yarn, said portions abutting one another and terminating in adjacent wales, and wrap yarn knit with the body yarn at a plurality of successive stitches including at least one stitch of said first portion and at least one stitch of the second portion, said portions being joined to one another by said warp yarn.

2. In an article of hosiery, a circular seamless leg portion comprising a plurality of circular knit courses, each of successive courses comprising successive portions knit respectively of different body yarns, the sequence of body yarns being repeated in successive courses to provide a plurality of adjacent areas disposed one after another in a coursewise direction and wrap yarn extending in a generally walewise direction along the boundaries between adjacent areas, said wrap yarn being knit with the body yarn at a plurality of stitches in each course including at least one stitch in one area and at least one stitch in the adjacent area.

3. In an article of hosiery, a circular knit leg portion comprising a plurality of circular knit courses, each of a plurality of successive courses comprising portions knit respectively of different body yarns, said portions being disposed in predetermined sequence around the course and the sequence being repeated in successive courses to provide a plurality of adjacent areas disposed one after another in a coursewise direction, the coursewise extent of the respective portions of a course formed of the different body yarns being varied from course to course to vary the coursewise extents of said areas, and wrap yarn extending along the boundaries between adjacent areas, said wrap yarn being knit with the body yarn at a plurality of stitches in each course including at least one stitch in one area and at least one stitch in the adjacent area, said areas being joined to one another by said wrap yarn.

4. In an article of hosiery, a circular seamless leg portion comprising a plurality of circular knit courses, each of a plurality of successive courses comprising portions knit respectively of different body yarns, said portions being disposed in predetermined sequence in a coursewise direction and the sequence being repeated in successive courses to provide a plurality of adjacent areas knit respectively of said yarns, the points of termination of the respective portions varying from course to course so that at least certain boundaries between said areas have both coursewise and walewise components, and wrap yarn extending along the boundaries between adjacent areas, said wrap yarn being knit with the body yarn at a plurality of stitches in each course, including at least one stitch in one area and at least one stitch in the adjacent area, said areas being tied together by said wrap yarn.

5. In an article of hosiery, a circular seamless leg portion comprising a plurality of circular knit courses, each of successive courses comprising a portion knit of a body yarn of one color and a second portion knit of a body yarn of a different color, said portions abutting one another and terminating in adjacent wales, and wrap yarn knit with the body yarn at a plurality of successive stitches including at least one stitch in said first portion and at least one stitch of the second portion, said portions being tied together by said wrap yarn.

6. An article according to claim 5, in which the wrap yarn is the same color as one of said body yarns.

7. An article according to claim 5 in which the wrap yarn is of a different color than said body yarns.

8. In an article of hosiery, a circular seamless leg portion comprising a plurality of circular knit courses, each of a plurality of successive courses comprising at least three portions, adjacent portions being knit respectively of different body yarns, said portions being arranged in predetermined sequence and the sequence being repeated in successive courses to provide adjacent areas formed respectively of said yarns, one of said areas progressively decreasing in coursewise extent, whereby the boundaries between said one area and adjacent areas on opposite sides thereof converge with one another, and wrap yarns extending along the boundaries between adjacent areas, each of said wrap yarns being knit with the body yarn at a plurality of stitches in each of successive courses including at least one stitch in one area and at least one stitch in the adjacent area to tie said areas together, two of said wrap yarns coming together where boundaries between the areas converge.

9. In an article of hosiery, a tubular seamless leg portion comprising a plurality of areas of different color disposed one beside another in a coursewise direction and a plurality of areas of different color disposed one below another in a walewise direction, adjacent areas being knit of different body yarn and the knitting of one body yarn in a course terminating at the point where the knitting of another body yarn starts, and wrap yarn extending along the boundaries between said areas, said wrap yarn being knit with the body yarn at a plurality of stitches in each of successive courses including at least one stitch in one area and at least one stitch in the adjacent area in each course to tie said areas together.

PAUL L. THURSTON.

References Cited in the file of this patent

UNITED STATES PATENTS

| Number | Name | Date |
|---|---|---|
| 2,167,390 | Lawson et al. | July 25, 1939 |
| 2,217,022 | Lawson et al. | Oct. 8, 1940 |
| 2,233,995 | Button, Jr., et al. | May 26, 1942 |
| 2,302,211 | Green | Nov. 17, 1942 |
| 2,516,697 | Haddad | July 25, 1950 |
| 2,522,265 | Haddad | Sept. 12, 1950 |

FOREIGN PATENTS

| Number | Country | Date |
|---|---|---|
| 308,421 | Great Britain | Mar. 28, 1929 |